June 4, 1940.  W. L. L. VIVIE  2,203,315
APPARATUS FOR MANUFACTURING CONDENSER ELECTRODES
Filed March 17, 1938
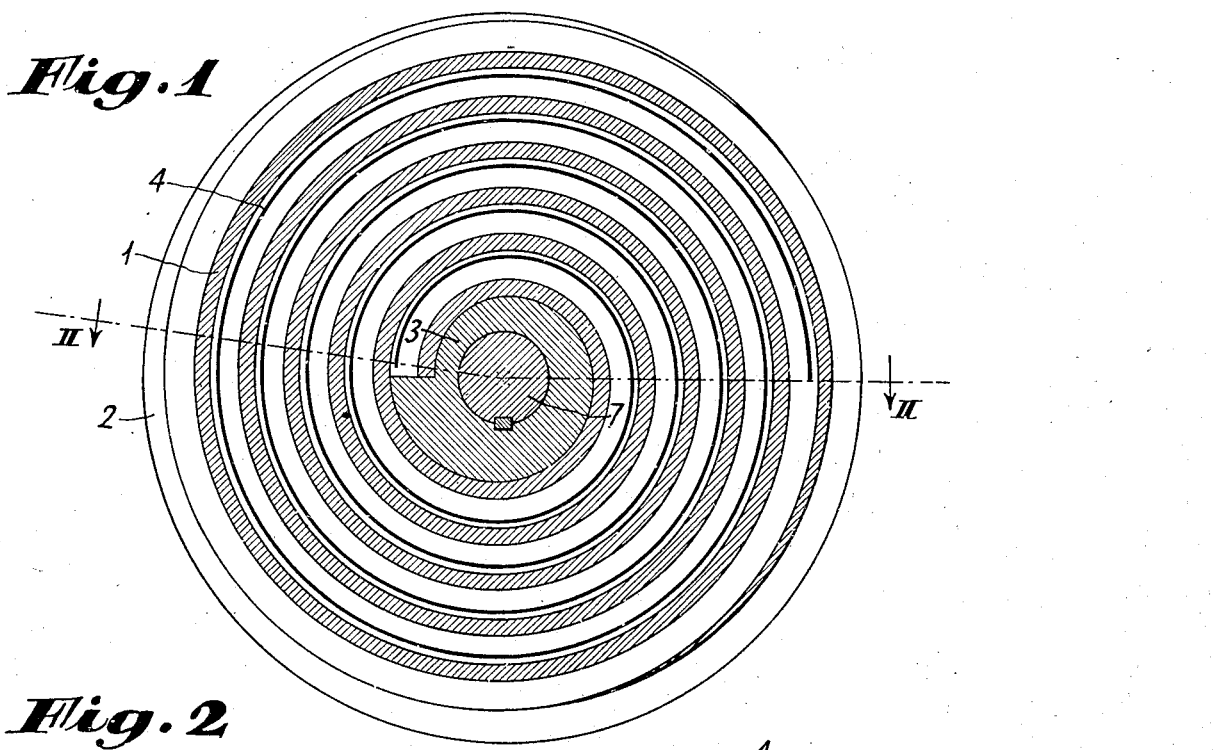
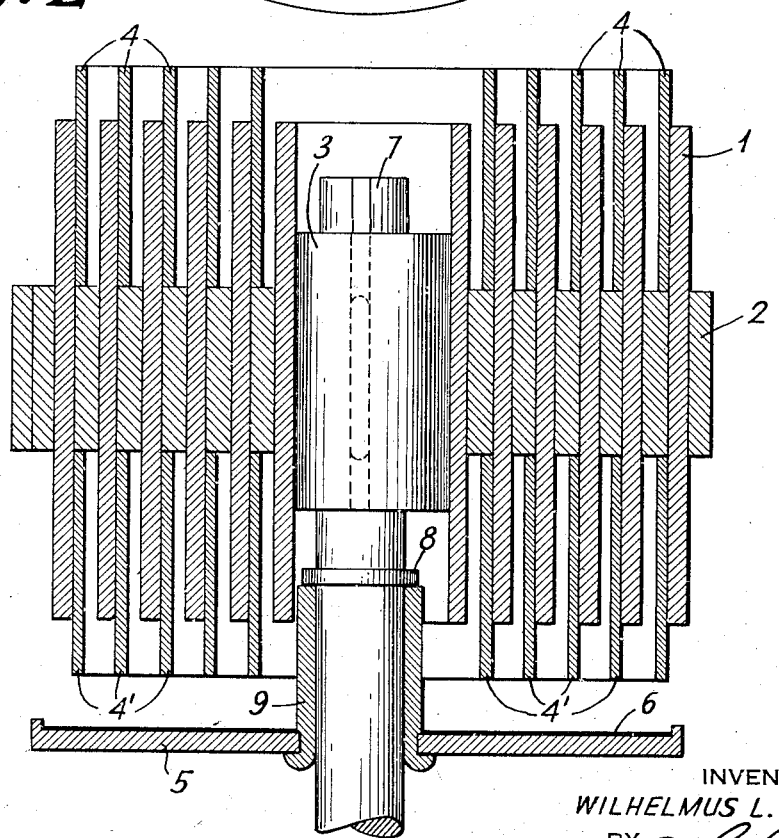
INVENTOR
WILHELMUS L. L. VIVIE
BY
ATTORNEY Patented June 4, 1940

2,203,315

UNITED STATES PATENT OFFICE 2,203,315

APPARATUS FOR MANUFACTURING CONDENSER ELECTRODES

Wilhelmus Lambertus Leonardus Vivie, Eindhoven, Netherlands, assignor, by mesne assignments, to Radio Corporation of America, New York, N. Y., a corporation of Delaware Application March 17, 1938, Serial No. 196,320 In Germany March 30, 1937

3 Claims. (Cl. 153—64)

The invention relates to a device for manufacturing condenser electrodes, more particularly for slidable condensers.

In the construction of radio receiving apparatus, measuring apparatus and the like there is a tendency of reducing the volume as much as possible. To that end attempts are made, inter alia to reduce as much as possible, the usual dimensions of rotary plate condensers which may be achieved in the first place by reducing the distance between the separate plates.

A distance of 0.5 mm. between the plates or a rotary condenser entails difficulties in the manufacture, which difficulties increase with any further reduction. Besides, a limit is set to the reduction of the dimensions of rotary condensers since for reasons of rigidity it is impossible to make the thickness of the separate plates materially smaller than 0.5 mm.

Slidable condensers having cylindrical or spiral electrodes are materially better from this point of view. The advantages of such condensers have been recognized already but the manufacture entails difficulties, in particular the mounting and the exact maintaining of the distance between the electrodes.

It has previously been proposed to provide the cylindrical or spiral electrodes, for the mounting thereof, with a rim and then to secure the latter to a disc-shaped plate.

It has previously further been proposed to set the electrodes in grooved disc-shaped plates.

With these known means it is, however, not possible to manufacture condenser electrodes with sufficient precision.

According to the invention, a resilient metal strip is placed in a matrix which has recesses which are parallel to the axis of the matrix and which are adapted to the electrode shape aimed at and then an edge of the metal strip is secured to a further constructive part.

Figures 1 and 2, which show two cross-sectional views, illustrates the manufacture of a spiral electrode, use being made of a double matrix. The latter consists of a metal strip 1 which is wound, jointly with a narrower metal strip 2, on a sleeve 3 and which is kept together by a clamping device (not shown). There is thus produced a double matrix which has two spiral recesses and the two halves of which have exactly the same dimensions.

Resilient metal strips 4 and 4', which form afterwards the electrodes of the condenser, are inserted into the spiral recesses of the matrix and, owing to the bending stresses, they engage the outside of these recesses. This is particularly important for it is thus possible to make the width of the recesses larger than the thickness of the metal strips 4 or 4' that are utilized so that without any trouble the strips may be inserted or removed. The metal strips 4 and 4' are pressed against the edge of the strip 2 of the matrix. If the depth of the recesses is chosen so as to be smaller than the width of the strips 4 and 4', the upper edges of the strips protrude from the matrix owing to which it is possible to place a flat base plate 5, with the interposition of a soldering foil 6, on the edges of the strips and to solder it thereto.

The sleeve 9 and the base plate 5 are centered by a shaft 7 which is slidably arranged in the sleeve 3. Exact centering is necessary in order to ensure that, when the electrodes are subsequently assembled to form a condenser, the sleeve 9 may be utilized for the mounting as well as for the guiding during adjustment. The shaft 7 has a collar 8 by means of which the completed electrode is expelled from the matrix. The two electrodes which are formed in this matrix are assembled to form a condenser and owing to the fact that the two electrodes are produced with the aid of the same matrix a great precision in the manufacture may be obtained (tolerance less than 0.5%). Already with a slight thickness of the strips (0.1 mm.) a sufficient rigidity and stability may be ensured in the case of an air gap of 0.2 mm. If the separate condensers are to be assembled to form a multiple condenser, it is advantageous to manufacture all the electrodes with the aid of the same matrix. With the method according to the invention it is possible to manufacture without any difficulty condensers of very small dimensions which occupy less than half the room taken up by ordinary rotary plate condensers. It is obvious from the above that by the use of the double ended matrix the two formed condenser sections are enantiomorphic in that while they are similar they are not superposable.

I claim:

1. A matrix adapted to be used in forming spiral condenser plates said matrix being provided with two oppositely spiral grooves said grooves being arranged to receive resilient metal strips and form therefrom a pair of enantiomorphic members adapted to cooperate with each other and form the plates of a condenser.

2. A matrix adapted to be used in forming spiral condenser plates, said matrix comprising a block like element provided with a central opening along its axis, a pair of enantiomorphic spiral grooves formed in said matrix on opposite sides thereof and so that the axis of the spiral grooves is common with the axis of said central opening.

3. A matrix adapted to be used in forming spiral condenser plates, said matrix comprising a block like element provided with a central opening along the axis of the block, a spiral recess formed in said block and having the same axis as said central opening, said spiral recess being parallel to said axis and arranged so as to receive a resilient metal strip which is to be formed into a spiral condenser plate, the depth of said spiral recess being less than the width of the strip whereby when the strip is inserted in said recess one edge of the strip protrudes an appreciable amount from the block, a centering shaft positioned within said central opening and arranged to receive and fix the position of a condenser plate sleeve member within the central opening, said sleeve member carrying a holding plate which is adapted to be attached to the protruding edge of the strip whereby withdrawal of the sleeve member from the shaft carries with it the formed spiral condenser plate.

WILHELMUS LAMBERTUS
LEONARDUS VIVIE.